United States Patent
Kwon

(10) Patent No.: US 11,183,174 B2
(45) Date of Patent: Nov. 23, 2021

(54) SPEECH RECOGNITION APPARATUS AND METHOD

(71) Applicant: Samsung Electronics Co., Ltd., Suwon-si (KR)

(72) Inventor: Ki Soo Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 16/351,612

(22) Filed: Mar. 13, 2019

(65) Prior Publication Data

US 2020/0074986 A1    Mar. 5, 2020

(30) Foreign Application Priority Data

Aug. 31, 2018 (KR) ................ 10-2018-0103584

(51) Int. Cl.
| | |
|---|---|
| *G06N 3/08* | (2006.01) |
| *G10L 15/06* | (2013.01) |
| *G10L 15/07* | (2013.01) |
| *G10L 15/14* | (2006.01) |
| *G10L 15/16* | (2006.01) |

(52) U.S. Cl.
CPC ............... *G10L 15/07* (2013.01); *G06N 3/08* (2013.01); *G10L 15/063* (2013.01); *G10L 15/14* (2013.01); *G10L 15/16* (2013.01)

(58) Field of Classification Search
CPC ....... G10L 15/063; G10L 15/07; G10L 15/14; G10L 15/16; G06N 3/08
See application file for complete search history.

(56) References Cited

U.S. PATENT DOCUMENTS

| | | | | |
|---|---|---|---|---|
| 5,793,891 | A * | 8/1998 | Takahashi | G10L 15/065 |
| | | | | 382/228 |
| 6,539,351 | B1 * | 3/2003 | Chen | G06K 9/6226 |
| | | | | 704/236 |
| 7,065,488 | B2 | 6/2006 | Yajima et al. | |
| 7,209,881 | B2 * | 4/2007 | Yoshizawa | G10L 15/065 |
| | | | | 704/233 |
| 7,379,868 | B2 * | 5/2008 | Reynolds | G10L 15/07 |
| | | | | 704/243 |
| 9,190,055 | B1 * | 11/2015 | Kiss | G10L 15/07 |
| 9,633,652 | B2 * | 4/2017 | Kurniawati | G10L 15/00 |
| 9,865,266 | B2 * | 1/2018 | Colibro | G10L 17/04 |
| 10,102,855 | B1 * | 10/2018 | Sindhwani | G06F 40/169 |
| 10,540,959 | B1 * | 1/2020 | Ward | G10L 15/02 |
| 2002/0046024 | A1 * | 4/2002 | Kompe | G10L 15/07 |
| | | | | 704/236 |

(Continued)

FOREIGN PATENT DOCUMENTS

| | | |
|---|---|---|
| JP | 8-110792 A | 4/1996 |
| JP | 2006-163440 A | 6/2006 |
| KR | 10-2017-0009338 A | 1/2017 |

*Primary Examiner* — Daniel C Washburn
*Assistant Examiner* — Oluwadamilola M Ogunbiyi
(74) *Attorney, Agent, or Firm* — NSIP Law

(57) ABSTRACT

A processor-implemented method of personalizing a speech recognition model includes: obtaining statistical information of first scaling vectors combined with a base model for speech recognition; obtaining utterance data of a user; and generating a personalized speech recognition model by modifying a second scaling vector combined with the base model based on the utterance data of the user and the statistical information.

25 Claims, 9 Drawing Sheets

(56) References Cited

U.S. PATENT DOCUMENTS

| | | | |
|---|---|---|---|
| 2003/0220791 A1* | 11/2003 | Toyama | G10L 15/07 704/256.3 |
| 2004/0015358 A1* | 1/2004 | Reynolds | G10L 15/07 704/255 |
| 2006/0064177 A1* | 3/2006 | Tian | G10L 15/197 700/1 |
| 2006/0122834 A1* | 6/2006 | Bennett | G10L 15/30 704/256 |
| 2010/0169090 A1* | 7/2010 | Cui | G10L 15/20 704/233 |
| 2010/0169093 A1* | 7/2010 | Washio | G10L 15/063 704/243 |
| 2012/0278073 A1* | 11/2012 | Weider | G10L 15/1815 704/235 |
| 2013/0225128 A1* | 8/2013 | Gomar | H04W 12/06 455/411 |
| 2014/0032214 A1* | 1/2014 | Ljolje | G10L 15/26 704/235 |
| 2014/0222428 A1* | 8/2014 | Cumani | G10L 17/02 704/250 |
| 2014/0244257 A1* | 8/2014 | Colibro | G10L 17/12 704/246 |
| 2015/0025890 A1* | 1/2015 | Jagatheesan | G10L 15/32 704/255 |
| 2015/0039299 A1* | 2/2015 | Weinstein | G10L 15/16 704/202 |
| 2015/0039301 A1* | 2/2015 | Senior | G10L 15/16 704/232 |
| 2015/0127342 A1* | 5/2015 | Sharifi | G10L 25/51 704/239 |
| 2015/0235637 A1* | 8/2015 | Casado | G10L 15/222 704/235 |
| 2015/0235651 A1* | 8/2015 | Sharifi | G10L 15/222 704/233 |
| 2015/0332665 A1* | 11/2015 | Mishra | G10L 15/1815 704/257 |
| 2016/0042739 A1* | 2/2016 | Cumani | G10L 17/06 704/239 |
| 2016/0111112 A1* | 4/2016 | Hayakawa | G10L 25/45 704/239 |
| 2016/0225374 A1* | 8/2016 | Rodriguez | G10L 17/10 |
| 2016/0293167 A1* | 10/2016 | Chen | H04N 21/23476 |
| 2016/0372116 A1* | 12/2016 | Summerfield | G10L 25/63 |
| 2017/0011738 A1* | 1/2017 | Senior | G10L 15/063 |
| 2017/0025119 A1* | 1/2017 | Song | G10L 15/14 |
| 2017/0124311 A1* | 5/2017 | Li | G10L 17/04 |
| 2017/0169815 A1* | 6/2017 | Zhan | G10L 15/07 |
| 2017/0206892 A1* | 7/2017 | Doddipatla | G10L 15/02 |
| 2017/0337935 A1* | 11/2017 | Komeiji | G10L 25/21 |
| 2017/0352346 A1* | 12/2017 | Paulik | G10L 15/01 |
| 2018/0005628 A1 | 1/2018 | Xue | |
| 2018/0061397 A1* | 3/2018 | Huang | G10L 15/063 |
| 2018/0061421 A1* | 3/2018 | Sarikaya | G10L 15/1815 |
| 2018/0082691 A1* | 3/2018 | Khoury | G10L 17/18 |
| 2018/0211649 A1* | 7/2018 | Li | G06F 40/169 |
| 2018/0253647 A1* | 9/2018 | Yu | G06F 17/16 |
| 2018/0308487 A1* | 10/2018 | Goel | G10L 15/26 |
| 2018/0357538 A1* | 12/2018 | Hwang | G06N 3/08 |
| 2018/0365232 A1* | 12/2018 | Lewis | G06F 40/58 |
| 2019/0080684 A1* | 3/2019 | Ichikawa | G10L 15/04 |
| 2019/0096385 A1* | 3/2019 | Kang | G10L 25/30 |
| 2019/0096405 A1* | 3/2019 | Kawamura | G10L 15/30 |
| 2019/0115031 A1* | 4/2019 | Li | G10L 17/20 |
| 2019/0221202 A1* | 7/2019 | Li | G06F 17/16 |
| 2019/0295087 A1* | 9/2019 | Jia | H04L 67/22 |
| 2019/0318724 A1* | 10/2019 | Chao | G10L 15/02 |
| 2019/0341026 A1* | 11/2019 | Visser | G06F 40/30 |
| 2019/0362711 A1* | 11/2019 | Nosrati | G06N 20/10 |
| 2019/0392839 A1* | 12/2019 | Fujimura | G10L 15/075 |
| 2020/0043471 A1* | 2/2020 | Ma | G10L 15/07 |
| 2020/0152207 A1* | 5/2020 | Wang | G10L 17/18 |
| 2020/0211706 A1* | 7/2020 | Wang | G06N 3/08 |
| 2020/0321008 A1* | 10/2020 | Wang | G06F 21/32 |
| 2021/0020161 A1* | 1/2021 | Gao | G10L 13/04 |
| 2021/0027163 A1* | 1/2021 | Baker | G06N 3/08 |

* cited by examiner

SPEECH RECOGNITION APPARATUS AND METHOD

CROSS-REFERENCE TO RELATED APPLICATIONS

This application claims the benefit under 35 USC § 119(a) of Korean Patent Application No. 10-2018-0103584 filed on Aug. 31, 2018 in the Korean Intellectual Property Office, the entire disclosure of which is incorporated herein by reference for all purposes.

BACKGROUND

1. Field

The following description relates to a speech recognition apparatuses and methods.

2. Description of Related Art

A speech recognition model is a model for performing a speech recognition. The speech recognition model recognizes a speech input of a user and outputs a speech recognition result. The speech recognition is a process of converting language information included in the speech input into textual information corresponding to the speech input. The speech recognition model estimates the textual information indicated by the language information included in the speech input by analyzing the speech input. The speech input has a form of a speech sequence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of personalizing a speech recognition model includes: obtaining statistical information of first scaling vectors combined with a base model for speech recognition; obtaining utterance data of a user; and generating a personalized speech recognition model by modifying a second scaling vector combined with the base model based on the utterance data of the user and the statistical information.

The first scaling vectors may correspond to a plurality of speakers; and the second scaling vector corresponds to the user.

The generating may include: initializing the second scaling vector; and training the second scaling vector based on the utterance data of the user and the statistical information.

The training may include: determining a first loss based on the utterance data of the user; determining a second loss based on the first loss and the statistical information; and training the second scaling vector based on the second loss.

The base model may include a plurality of neural network layers; and the first scaling vectors are combined between at least a portion of the plurality of layers.

The plurality of layers may include one or more hidden layers; and the one or more hidden layers are each combined with a respective first scaling vector of the first scaling vectors, such that an output of each of the one or more of the hidden layers is adjusted based on the respective first scaling vector.

The statistical information may include either one or both of a mean and a variance generated by approximating a Gaussian distribution of the first scaling vectors corresponding to a plurality of speakers.

Each of the first scaling vectors may include a plurality of elements; and the mean and the variance may be calculated for each of the plurality of elements.

The generating may include: determining a reflectance rate of the statistical information based on the utterance data; and generating the personalized speech recognition model by training the second scaling vector by reflecting the statistical information in a loss function of the base model based on the reflectance rate.

The reflecting of the statistical information may include determining a difference between the loss function of the base model and a value determined based on the reflectance rate and a variance of a distribution of the first scaling vectors.

The determining may include adjusting the reflectance rate of the statistical information based on a quantity of the utterance data.

The reflectance rate may be adjusted to be greater for a first quantity of the utterance data than for a second quantity of the utterance data; and the first quantity of utterance data may be less than the second quantity of utterance data.

The generating may include: training, in response to the utterance data being obtained, the second scaling vector based on the utterance data by fixing the statistical information while training the second scaling vector.

The method may include: updating the statistical information, in response to the second scaling vector being changed in response to the training.

The method may include: recognizing a speech of the user using the speech recognition model.

A non-transitory computer-readable storage medium may store instructions that, when executed by one or more processors, cause the one or more processors to perform the method.

In another general aspect, a processor-implemented method of personalizing a speech recognition model includes: obtaining a base model for speech recognition using speech data corresponding to a plurality of speakers; generating statistical information of scaling vectors combined with the base model by applying datasets including the speech data to the scaling vectors; and providing the statistical information to generate a personalized speech recognition model.

The generating of the statistical information may include generating the statistical information of the scaling vectors by training the scaling vectors using the datasets so as to minimize a loss of the base model.

The generating of the statistical information may include: generating per-speaker datasets based on the speech data; training the scaling vectors using each of the per-speaker datasets; and generating the statistical information of the scaling vectors based on a result of training the scaling vectors.

At least a portion of the speech data may include a speaker identifier; and the generating of the per-speaker datasets may include: classifying per-speaker speech data using the speaker identifier included in the speech data, and generating the per-speaker datasets using the per-speaker speech data.

The generating of the per-speaker datasets using the per-speaker speech data may include either one or both of: generating a single dataset using all the per-speaker speech data; and generating a single dataset using a portion selected at random from the per-speaker speech data.

The training may include training the scaling vectors using the per-speaker datasets; and the scaling vectors correspond to at least a portion of layers of the base model.

The training may include training the scaling vectors independently for each of the per-speaker datasets.

The generating of the statistical information may include generating a mean and a variance of the scaling vectors by approximating a Gaussian distribution of the scaling vectors.

In another general aspect, an apparatus for personalizing a speech recognition model includes: a communication interface configured to obtain statistical information of first scaling vectors combined with a base model for speech recognition; a sensor configured to obtain utterance data of a user; and one or more processors configured to generate a personalized speech recognition model by modifying a second scaling vector combined with the base model based on the utterance data of the user and the statistical information.

In another general aspect, a processor-implemented method of personalizing a speech recognition model includes: obtaining a distribution variance information of elements of first scaling vectors combined with a speech recognition base model, wherein the first scaling vectors were previously-trained based on speech datasets of a plurality of speakers; generating a personalized speech recognition model by training a second scaling vector combined with the base model based on utterance data of a user and the distribution variance information.

Other features and aspects will be apparent from the following detailed description, the drawings, and the claims.

Figure 1:
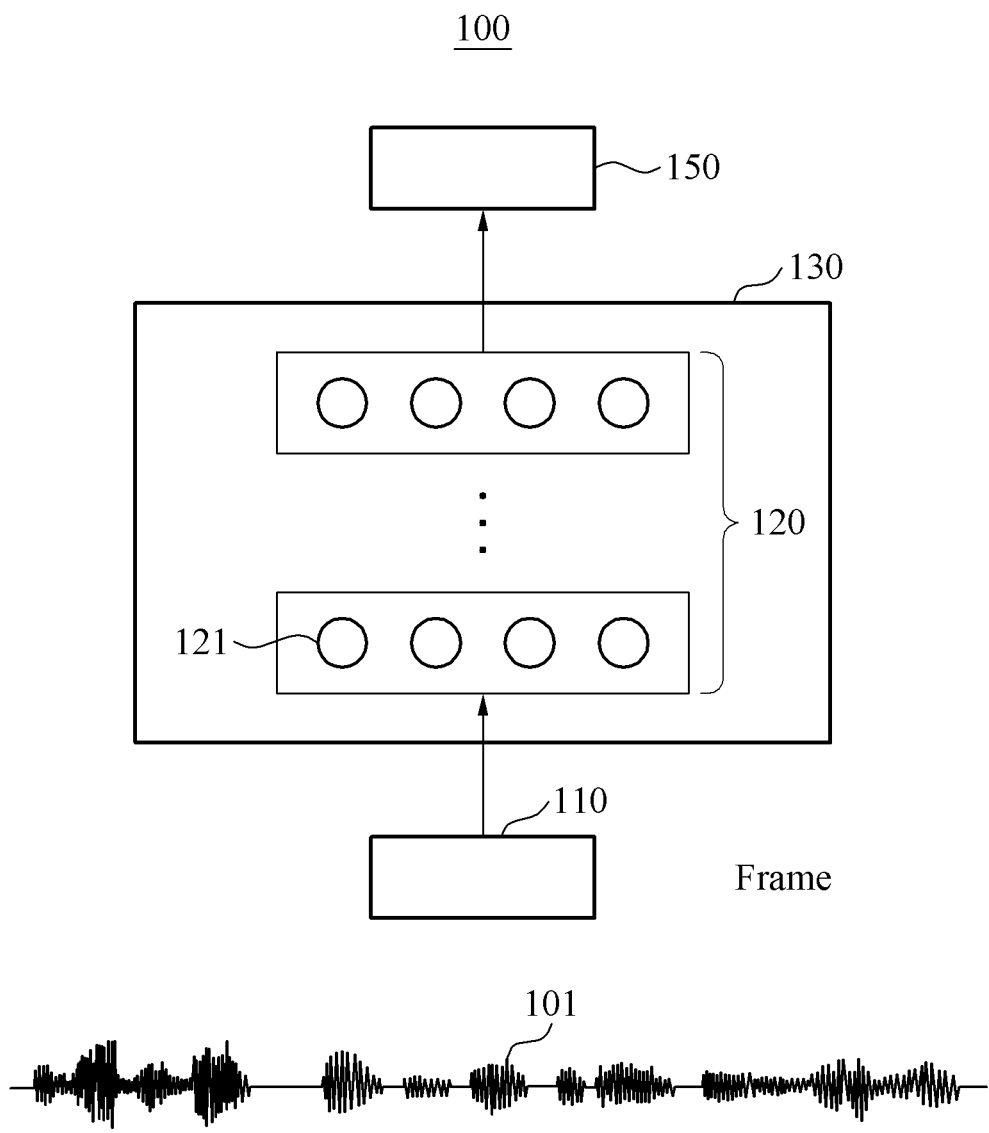
FIG. 1 illustrates an example of a base model for speech recognition.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Accordingly, the examples are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of a base model for speech recognition. A speech recognition apparatus is an apparatus that collects sounds from around the speech recognition apparatus and obtains a speech signal which is a digital electrical signal from the collected sounds. For example, the speech recognition apparatus collects sounds produced by a person speaking near the speech recognition apparatus. The speech recognition apparatus may collect sound using a receiver or sensor (e.g., a microphone) that is a component of the speech recognition apparatus, or may receive the speech signal from the receiver, wherein the receiver is separate or external to the speech recognition apparatus. The speech recognition apparatus distinguishes a speech of a user of the speech recognition apparatus (or a user of an apparatus corresponding to the speech recognition apparatus) from the sounds around the speech recognition apparatus.

The speech recognition apparatus is an electronic device used by individual users and includes, for example, a smart phone, a smart pad, a wearable device such as a smart band, a personal digital assistant (PDA), a laptop, an internal component thereof, or a standalone apparatus in connection thereto. In another example, the speech recognition apparatus is an electronic device shared by a plurality of users and includes, for example, a speech recognition speaker and a speech recognition TV.

The speech recognition apparatus recognizes a speech of the user. Speech recognition may refer to an operation of distinguishing a speech of a user included in a sound signal and/or an operation converting the speech of the user into a language. For example, the speech recognition may be an operation of converting the speech of the user into text.

The speech recognition apparatus recognizes a speech signal and generates text data corresponding to the speech signal. The speech recognition apparatus receives the speech signal of the user and generates the text data corresponding to the speech signal based on the received speech signal. The speech recognition apparatus transmits the text data converted from the speech signal to an external device. The text data generated by the speech recognition apparatus is utilized for various services to be provided to the user.

A base model for speech recognition, hereinafter, the "base model", 100 is a model designed to output text data from a speech signal. The base model 100 includes an acoustic model and a language model. Herein, an example in which the speech recognition apparatus stores or calls the base model 100 and recognizes a speech of a user based on the base model 100 will be described. For example, the speech recognition apparatus performs a speech recognition using a speech signal and/or feature data converted from the speech signal.

The acoustic model is a model that recognizes a speech signal on a phoneme basis from features extracted from the speech signal. For example, the speech recognition apparatus estimates words represented by the speech signal based on a result of recognizing the obtained speech signal on the phoneme basis by the acoustic model.

The language model is a model designed to obtain probability information based on a connection relation between words. The language model provides probability information related to a subsequent word to follow a word input into the language model. For example, in a case in which a word "this" is input into the language model, the language model provides probability information of "is" or "was" to follow "this". In an example, the speech recognition apparatus selects a highest-probability connection relation between words based on the probability information provided by the language model, and outputs a result of the selection as a speech recognition result.

Hereinafter, an operation of the base model 100 associated with the acoustic model will be described. The acoustic model is implemented as a neural network, for example, in various structures such as a Gaussian mixture model (GMM), a deep neural network (DNN), and a bidirectional long short-term memory (BLSTM). A machine learning structure as which the acoustic model is implemented is not limited thereto, and the acoustic model may be implemented in a form of combination of one or more of the structures of the GMM, DNN, and the BLSTM. The neural network is a recognition model implemented as software or hardware to simulate a computing ability of a biological system using a large number of nodes. The neural network performs a cognitive function or a learning process through the nodes.

The neural network 130 includes a plurality of layers. For example, the neural network 130 includes an input layer, at least one hidden layer 120, and an output layer. The input layer receives input data (for example, a frame 110) and transmits the input data to the hidden layer 120, and the output layer generates output data based on signals received from nodes of the hidden layer 120.

The at least one hidden layer 120 is disposed between the input layer and the output layer, and a speech recognition system converts the input data into predictable values through the hidden layer 120. Nodes included in the input layer and nodes included in a first hidden layer of the at least one hidden layer 120 are connected to each other through edges having connection weights, and nodes included in a last hidden layer of the hidden layer 120 and the output layer are also connected to each other through edges having connection weights. Among neural networks, a neural network including a plurality of hidden layers 120 is referred to as a deep neural network (DNN). Training the DNN is referred to as deep learning. Among nodes of the neural network, a node included in the hidden layer 120 is referred to as a hidden node 121.

The input layer, the at least one hidden layer 120, and the output layer include a plurality of nodes. The at least one hidden layer 120 is a convolution filter or a fully connected layer in a convolutional neural network (CNN), or various types of filters or layers bound based on special functions or features.

The acoustic model is implemented, for example, as a recurrent neural network (RNN). The RNN is a network in which an output value of the hidden layer 120 of a previous frame is input again into the hidden layer 120 of a current frame. In the RNN, previous outputs affect a computation result of a new output. In an embodiment, the neural network 130 includes both the CNN and the RNN, wherein either one or both of the CNN and the RNN includes an input layer, at least one hidden layer 120, and an output layer, and wherein an output of the output layer of the CNN is an input of the input layer of the RNN.

The speech recognition apparatus divides a speech sequence 101 into a plurality of frames and predicts an utterance corresponding to each of the frames. The speech recognition apparatus performs a speech recognition using the base model 100. The base model 100 includes the neural network 130 which includes the input layer, the hidden layer 120, and the output layer. The output layer outputs an utterance result 150 predicted with respect to the frame 110 input into the input layer. For example, the speech recognition apparatus inputs outputs of previous hidden nodes 121 included in a previous hidden layer 120 into each node included in a subsequent hidden layer 120 through edges having connection weights, and generates outputs of the hidden nodes 121 included in the hidden layer 120 based on values obtained by applying the connection weights to the outputs of the previous hidden nodes 121 and activation functions. In an example, in an example where a processor of the speech recognition apparatus is a neuromorphic processor, when a result of the activation functions exceeds a threshold value of a current hidden node, the processor may fire the output to a subsequent hidden node. In an example, a node maintains a deactivated state without firing a signal to a subsequent node until a threshold strength of activation is reached through input vectors.

The output layer is a softmax layer. The output layer includes as many nodes as utterance probabilities. That is, each node of the output layer represents a probability of the input frame 110 corresponding to a specific utterance.

Hereinafter, operations of an apparatus for personalizing a speech recognition model will be described. Herein, the apparatus for personalizing the speech recognition model, hereinafter, the "personalization apparatus", is a speech recognition apparatus or an apparatus included in the speech recognition apparatus.

Figure 2:
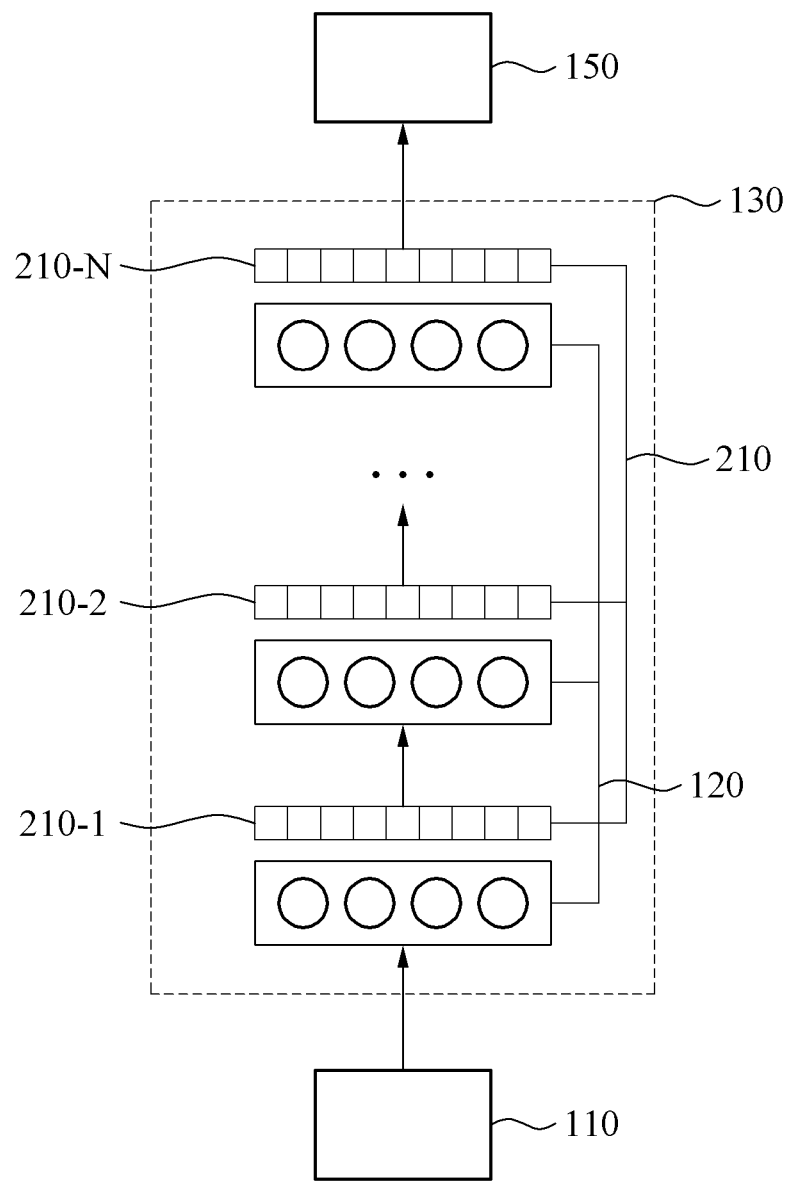
FIG. 2 illustrates an example of a base model combined with first scaling vectors.

FIG. 2 illustrates an example of a base model combined with first scaling vectors. Referring to FIG. 2, first scaling vectors 210-1, 210-2, . . . , 210-N of a base model are illustrated.

Speech data corresponding to a plurality of speakers is used to generate a base model for speech recognition. The first scaling vectors 210-1, 210-2, . . . , 210-N correspond to a plurality of speakers or utterances for different countries, dialects, or regions. For example, each of the first scaling vectors 210-1, 210-2, . . . , 210-N correspond to a respective data set.

As described above, the base model includes a plurality of layers, and each layer includes as few as 200 or less units (parameters), or as many as thousands or more units (parameters). In base models of previous speech recognition apparatuses, functions of such parameters are unclear, and the parameters may be considered as middle feature vectors from an input value to an output value. However, in an example of a speech recognition of the present application, the functions of such units or a change in general value are known with prior knowledge, and therefore additional training for personalization may be performed stably even using a small amount of data.

One or more first scaling vectors 210-1, 210-2, . . . , 210-N are added in the middle of the base model for personalization, and the first scaling vectors 210-1, 210-2, . . . , 210-N are trained using additional data. In an example, by training the first scaling vectors 210-1, 210-2, . . . , 210-N using a large volume of data, a large number of personalization vectors (for example, scaling vectors) are obtained. By reflecting a statistical characteristic of second scaling vectors in personalization training as a predetermined weight, the speech recognition model is personalized stably using a small quantity of additional data.

Depending on an embodiment, the concept of "personalization" refers to adapting to a voice of a single speaker, and/or adapting to an utterance for each country and/or region in an example in which each country or region has a different accent and/or dialect, as with the English language, for example. Examples of personalization to adapt to a single speaker will be described below.

Figure 3:
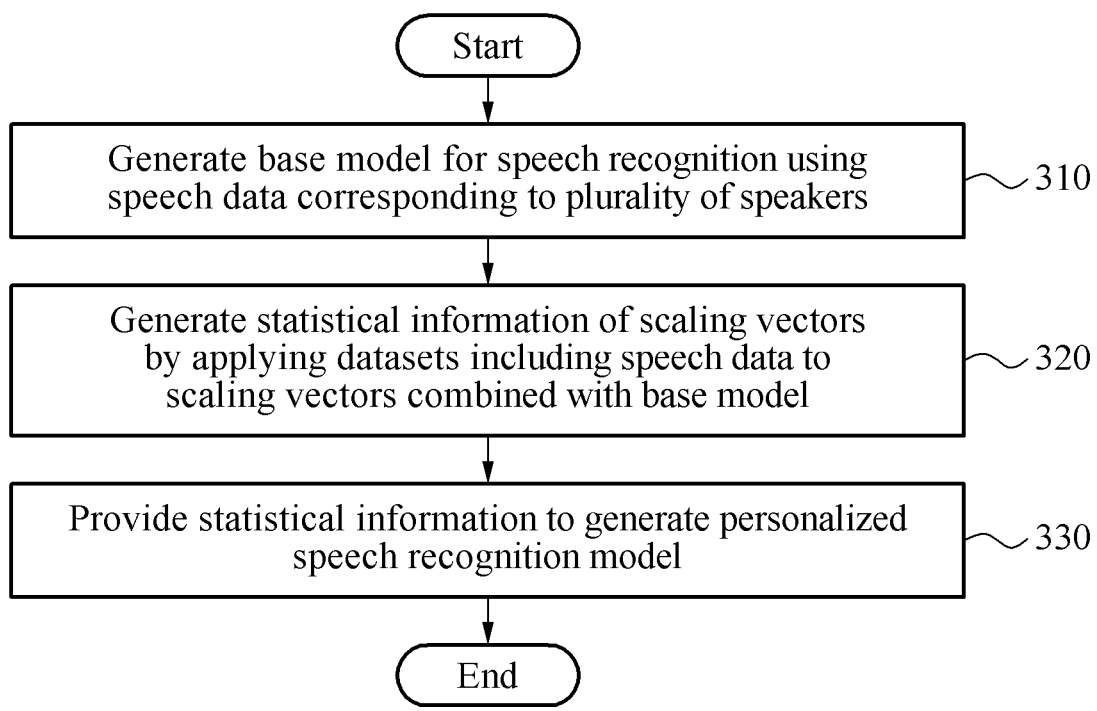
FIG. 3 is a flowchart illustrating an example of a method of personalizing a speech recognition model.

FIG. 3 is a flowchart illustrating an example of a method of personalizing a speech recognition model. Referring to FIG. 3, in operation 310, a personalization apparatus generates a base model for speech recognition using speech data corresponding to a plurality of speakers. The personalization apparatus generates a deep learning-based base model using a large volume of speech data to create an acoustic model suitable for all speakers or all speech characteristics. In an example, a speaker identifier is indicated in at least a portion of the speech data. Further, layers of the base model and activation functions are not limited. The base model obtained in operation 310 is used as being fixed without change in all processes described below. For example, during training of either of the first or second scaling vectors, weights and biases of the base model may be fixed, as will be described below. A method of the personalization apparatus generating a base model will be described in detail with reference to FIG. 4.

In operation 320, the personalization apparatus generates statistical information of scaling vectors combined with the base model by applying datasets including the speech data to the scaling vectors. The personalization apparatus generates the statistical information of the scaling vectors by training the scaling vectors (for example, first scaling vectors) so as to minimize a loss of the base model using the datasets. The personalization apparatus trains scaling vectors corresponding to at least a portion of layers of the base model using per-speaker datasets. In further detail, a process of the personalization apparatus generating the statistical information is as follows.

First, the personalization apparatus generates the per-speaker datasets based on the speech data. For example, the personalization apparatus classifies the speech data into per-speaker speech data using a speaker identifier included in the speech data, and generates the per-speaker datasets using the per-speaker speech data. In an example, the personalization apparatus generates a single per-speaker dataset using all the per-speaker speech data for a given speaker or generates a single per-speaker dataset using a randomly-selected portion of the per-speaker speech data for the given speaker. In another example, the personalization apparatus classifies the speech data into a plurality of per-speaker speech data using a plurality of speaker identifiers included in the speech data such that each of the per-speaker speech data corresponds to a respective one of the speaker identifiers, wherein each of the speaker identifiers corresponds to a respective speaker.

The personalization apparatus trains the scaling vectors using each of the per-speaker datasets. For example, the personalization apparatus trains the scaling vectors independently for each of the per-speaker datasets. In an example, the number of scaling vectors corresponds to the number of datasets. The personalization apparatus generates the statistical information of the scaling vectors based on a result of training the scaling vectors. For example, if speech data of a single speaker (a speaker A) include 1000 sentences, and a single per-speaker dataset includes 10 sentences, the personalization apparatus generates multiple per-speaker datasets corresponding to the single speaker (the speaker A). In an example, the multiple datasets corresponding to the single speaker are datasets to personalize a speech recognition model. The personalization apparatus trains scaling vectors to be used for personalization respectively for various speakers and various datasets, thereby obtaining as many scaling vectors as datasets.

The personalization apparatus generates statistical information by statistically processing the scaling vectors using various schemes. For example, the personalization apparatus obtains a mean and a variance of respective elements of the scaling vectors by approximating the Gaussian distribution of elements of the scaling vectors (e.g., a mean and variance of a distribution of first elements (e.g., including first element 510 of FIG. 5) of the scaling vectors 440 of FIG. 5). For example, if a variance of an element (or unit) of the scaling vectors in the statistical information is greater than a predetermined criterion, the corresponding element is determined to be an element which may change greatly in terms of personalization. If a variance of an element is less than the predetermined criterion, the corresponding element is determined to represent a feature almost irrelevant to a personal difference in utterance. Such statistical information has different characteristics when adapting to a single person and when adapting to an utterance of a single region. Further, in a base model for speech recognition, elements which change greatly based on a regional characteristic and elements which change greatly due to a difference in voice between men and women also have different characteristics of statistical information.

The statistical information includes speech statistical information based on speech characteristics of datasets and/or environment statistical information based on datasets with changed direction information and noise in datasets. The personalization apparatus trains the scaling vectors maximally using speech statistical information (speech characteristics) by adding noise to the datasets at random.

In operation 330, the personalization apparatus provides the statistical information to generate a personalized speech recognition model. The personalization apparatus stores the statistical information in a memory of the personalization apparatus, or provides the statistical information to a separate storage device or a separate server.

Figure 4:
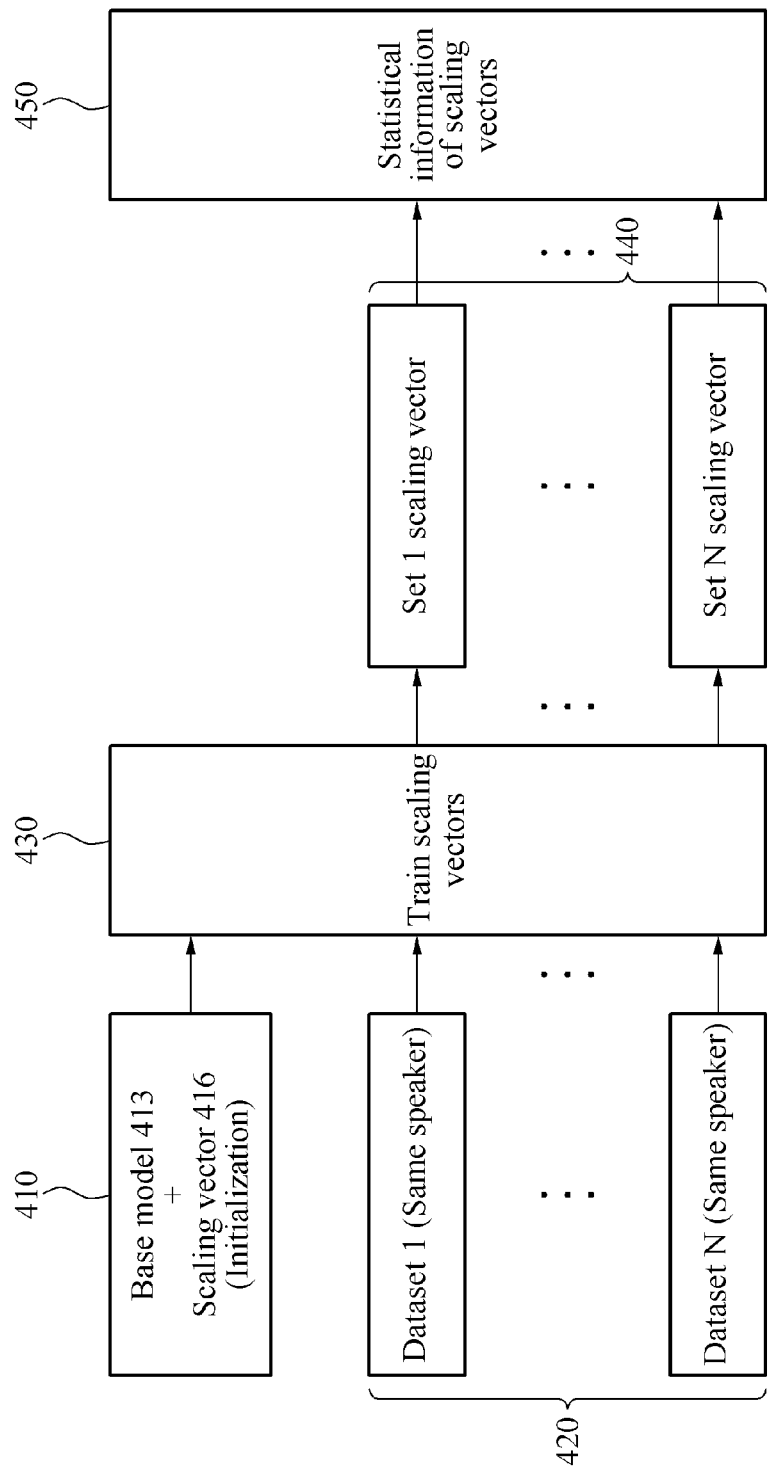
FIG. 4 illustrates an example of a process of providing statistical information to generate a personalized speech recognition model.

FIG. 4 illustrates an example of a process of providing statistical information to generate a personalized speech recognition model. Referring to FIG. 4, a speech recognition base model 410, datasets 420, scaling vectors 440, operation 430 of training scaling vectors, and operation 450 of generating statistical information of scaling vectors are illustrated.

The speech recognition base model 410 includes a base model 413 trained using the entire speech database (DB) used for training of a general speech recognition model, and scaling vector(s) 416 combined with the base model 413. The entire speech DB includes utterance data (speech data) of a large number of men and women of all ages.

The speech recognition base model 410 is a model to which a single scaling vector is added or as many scaling vectors as layers of the base model 413 are added to the layers, for example, like a linear hidden unit contributor (LHUC) which trains a neural network acoustic model to be specialized for a user. Here, values of elements of the scaling vectors 416 added to the base model 413 are all initialized to "1". In an example, the base model 413 corresponds to the base model 100 described above.

The speech recognition base model 410 is an acoustic model which exhibits an average performance for voices of general people. In an example, a speaker ID is marked in each piece of utterance data included in the entire speech DB or only a portion of the utterance data. The speech recognition base model 410 is a base model of a personalized speech recognition model to be generated later.

The datasets 420 are data satisfying a predetermined criterion, and a single dataset includes utterance data of the same speaker. Depending on a purpose, the single dataset includes 5 or more pieces of utterance data, for example. The personalization apparatus mixes a lot of noise at random with the utterance data included in the entire speech DB, thereby preventing environment information from being skewed to one side. The scaling vectors can effectively and efficiently learn a difference in voice characteristic of various people using utterance data mixed with a lot of noise.

The personalization apparatus trains the speech recognition base model 410 using the datasets 420 corresponding to a plurality of speakers. The personalization apparatus trains the scaling vectors 440 so as to minimize a loss of the base model 413 using the datasets 420, in operation 430. In an example, parameters of the base model 413 included in the speech recognition base model 410 are all fixed, and only the added scaling vector(s) 416 are trained and updated. The personalization apparatus trains the scaling vectors 440 independently for each of independent datasets (that is, for each of per-speaker datasets). Here, the scaling vectors 440 are first scaling vectors, which correspond to a result of training the initialized scaling vector(s) 416 combined with the base model 413.

After operation 430 is performed, the personalization apparatus obtains as many trained scaling vectors 440 as datasets 420. In an example in which the number of datasets is "N", and a degree of the scaling vectors is "K", the personalization apparatus obtains a matrix of (N, K) size.

The personalization apparatus generates statistical information of the scaling vectors by statistically processing as many scaling vectors 440 as datasets 420, in operation 450. A process of the personalization apparatus generating the statistical information of the scaling vectors by statistically processing the scaling vectors 440 will be described further with reference to FIG. 5.

Figure 5:
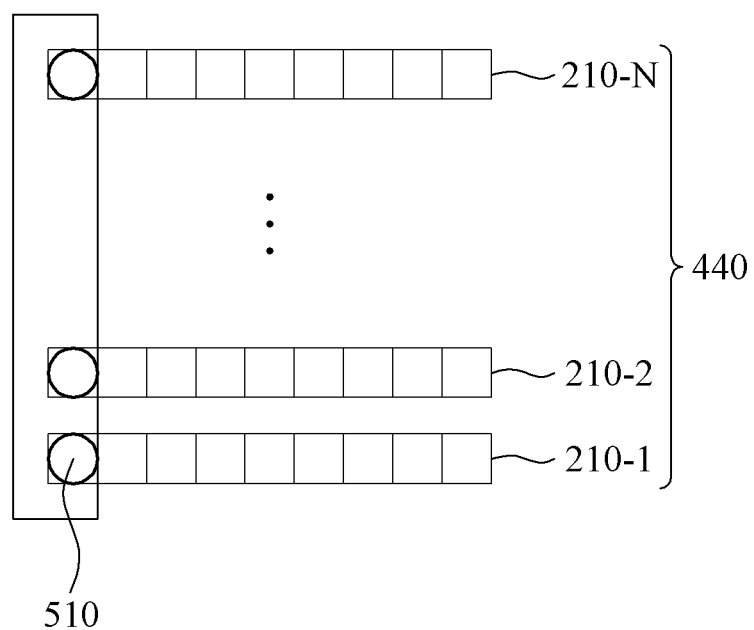
FIG. 5 illustrates an example of a process of generating statistical information.

FIG. 5 illustrates an example of a process of generating statistical information. Referring to FIG. 5, the scaling vectors 440 corresponding to datasets are illustrated.

The scaling vectors 440 include, for example, the first scaling vectors 210-1, 210-2, . . . , 210-N.

The scaling vectors 440 respectively correspond to datasets of the same speaker. For example, the first scaling vector 210-1 corresponds to a dataset 1 (of a first speaker), and the scaling vector 210-2 corresponds to a dataset 2 (of the first speaker). Further, the scaling vector 210-N corresponds to a dataset N (of the first speaker).

The personalization apparatus trains the scaling vectors independently for each of the per-speaker datasets. For example, the personalization apparatus trains each scaling vector independently based on the scaling vector's corresponding dataset. The personalization apparatus generates the statistical information of the scaling vectors by training the scaling vectors so as to minimize a loss of the base model for each of the per-speaker datasets.

The personalization apparatus calculates a mean and a variance of respective elements of the scaling vectors, e.g., a mean and a variance of first elements of the scaling vectors by statistically processing (for example, approximating by the Gaussian distribution) a first element 510 of the scaling vector 210-1, a first element of the scaling vector 210-2, . . . , and a first element of the scaling vector 210-N. Further, the personalization apparatus calculates a mean and a variance of a second element of the scaling vectors by statistically processing a second element of the scaling vector 210-1, a second element of the scaling vector 210-2, . . . , and a second element of the scaling vector 210-N, etc. Accordingly, in an example, the personalization apparatus determines statistical information (e.g., a mean and a variance) for the first elements of the scaling vectors, the second elements of the scaling vectors, etc. In an example, the personalization apparatus calculates a mean and a variance of each element of the scaling vectors.

Figure 6:
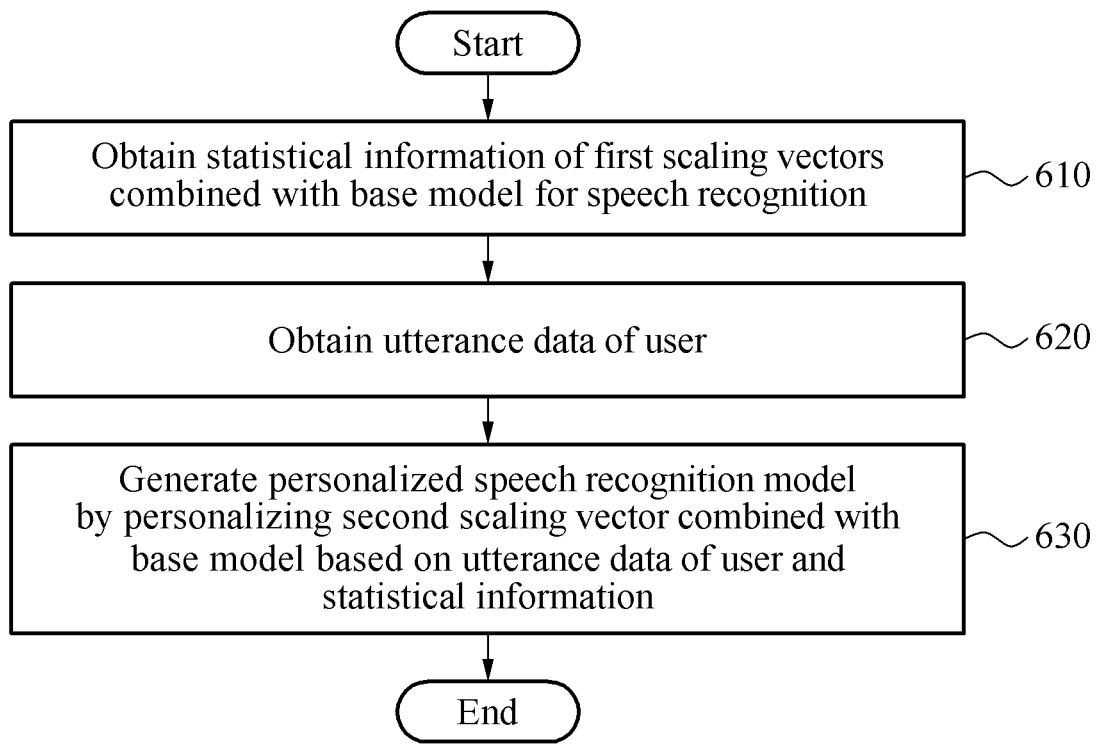
FIG. 6 is a flowchart illustrating an example of a method of personalizing a speech recognition model.

FIG. 6 is a flowchart illustrating an example of a method of personalizing a speech recognition model. Referring to FIG. 6, in operation 610, a personalization apparatus obtains statistical information of first scaling vectors combined with a base model for speech recognition. In an example, the base model includes a plurality of layers, and first scaling vectors are combined between at least a portion of the plurality of layers. The first scaling vectors correspond to a plurality of speakers and/or datasets of the plurality of speakers. The statistical information includes a mean and a variance generated by approximating the first scaling vectors corresponding to the plurality of speakers by the Gaussian distribution. The personalization apparatus discerns a meaning (for example, influence) of each scaling vector in the speech recognition model through the statistical information of the first scaling vectors.

In operation 620, the personalization apparatus obtains utterance data of a user.

In operation 630, the personalization apparatus generates a personalized speech recognition model by personalizing a second scaling vector combined with the base model based on the utterance data of the user and the statistical information. First, the personalization apparatus initializes the second scaling vector. The personalization apparatus trains the second scaling vector based on the utterance data of the user and the statistical information. For example, the personalization apparatus determines a first loss based on the utterance data of the user. The first loss corresponds to a difference (loss) between the utterance data and answer text (reference text). The personalization apparatus determines a second loss based on the first loss and the statistical information. The second loss corresponds to a difference between average users and the corresponding user, that is, a personalization loss. The personalization apparatus trains the second scaling vector based on the second loss. The personalization apparatus trains the second scaling vector so as to minimize the second loss. In an example, the second scaling vector is a single scaling vector corresponding to the user on which speech recognition is to be performed, among the first scaling vectors. The personalization apparatus recognizes a speech of the user using the personalized speech recognition model generated in operation 630.

In an example, the personalization apparatus adds the statistical information obtained in operation 610 to the original objective function (for example, a loss function of the base model) in a form of a separate function, in the personalization process of operation 630. The personalization apparatus adjusts a weight level of the objective function (that is, a reflectance rate of the statistical information) by utilizing the statistical information as a trade-off parameter.

In detail, the personalization apparatus determines the reflectance rate of the statistical information based on the utterance data. For example, the personalization apparatus adjusts the reflectance rate of the statistical information in inverse proportion to a quantity (the number) of the utterance data. If the quantity of the utterance data is relatively great, sufficient data for personalization training is obtained even if the statistical information is not reflected, and thus the personalization apparatus lowers the reflectance rate of the statistical information. Conversely, if the quantity of the utterance data is relatively small, the personalization apparatus increases the reflectance rate of the statistical information, thereby stably performing personalization training even using a small quantity of data. That is, the personalization apparatus reduces the reflectance rate of the statistical information when the quantity of the utterance data is relatively great, thereby reducing a risk of a characteristic of actual utterance data of the user being little reflected. In addition, the personalization apparatus increases the reflectance rate of the statistical information when the quantity of the utterance data is relatively small, thereby preventing a sharp performance degradation (of speech recognition) occurring in an example in which the quantity of the utterance data is relatively small.

The personalization apparatus generates the personalized speech recognition model by training the second scaling vector by reflecting the statistical information in a loss function of the base model based on the reflectance rate of the statistical information.

For example, the personalization apparatus reflects the statistical information in the original objective function, as expressed by Equation 1.

$$L = L_{ce} - \lambda \cdot P(r, \theta)$$ [Equation 1]

In Equation 1, L denotes a loss function of the personalized speech recognition model, and $L_{ce}$ denotes the loss function of the base model. $\lambda$ denotes the reflectance rate of the statistical information, and $\lambda > 0$. r denotes a scaling vector. $\theta = N(\mu, \sigma)$, $\mu$ denotes a variance, and $\sigma$ denotes a standard deviation (e.g., a standard deviation of the scaling vector distribution).

For example, if the reflectance rate $\lambda$ of the statistical information satisfies $\lambda = 0$, the personalization apparatus personalizes the personalized speech model using the loss function of the base model. The personalization apparatus reflects the characteristic of the statistical information relatively greatly as a value of the reflectance rate $\lambda$ of the statistical information is relatively great, thereby generating the personalized speech recognition model.

In an example, the reflectance rate $\lambda$ of the statistical information is determined based on the size of personalization data, that is, the number (quantity) of utterance data of the user. For example, if the quantity of the utterance data of the user is considerably great, for example, the utterance data includes 100 sentences, the personalization apparatus stably recognizes a speech of the user although the reflectance rate $\lambda$ of the statistical information is close to "0". Conversely, if the quantity of the utterance data of the user is relatively small, for example, the utterance data includes 5 sentences or 10 sentences, the personalization apparatus stably recognizes a speech of the user by determining the reflectance rate $\lambda$ of the statistical information to be close to "1".

In an example, utterance data including 3 sentences is set to be a minimum value of a dataset, and utterance data including 100 sentences is set to be a maximum value of the dataset. In an example, the reflectance rate $\lambda$ of the statistical information has a maximum value $\lambda_{max}$ (e.g., "1") for the utterance data including 3 sentences and has a minimum value $\lambda_{min}$ (e.g., "0") for the utterance data including 100 sentences. The personalization apparatus adjusts the reflectance rate $\lambda$ of the statistical information within the range of $\lambda_{max}$ (e.g., "1") to value $\lambda_{min}$ (e.g., "0") based on the quantity of utterance data.

In an example in which the quantity of utterance data for personalization is relatively small, a value of a scaling vector (the second scaling vector) for personalization is stably updated for personalization using the statistical information of scaling vectors, whereby a sharp performance degradation is prevented. Further, in an example in which the quantity of utterance data for personalization is relatively small, a personalization of the speech recognition model is boosted using the statistical information of the scaling vectors, whereby an excellent speech recognition effect is achieved even with a little training epoch.

In an example, the personalization apparatus trains the second scaling vector based on the utterance data in response to the utterance data being obtained in operation 620, and fixes (a value of) the statistical information obtained in operation 610 while training the second scaling vector. The personalization apparatus updates the statistical information in response to the second scaling vector being changed by training.

Figure 7:
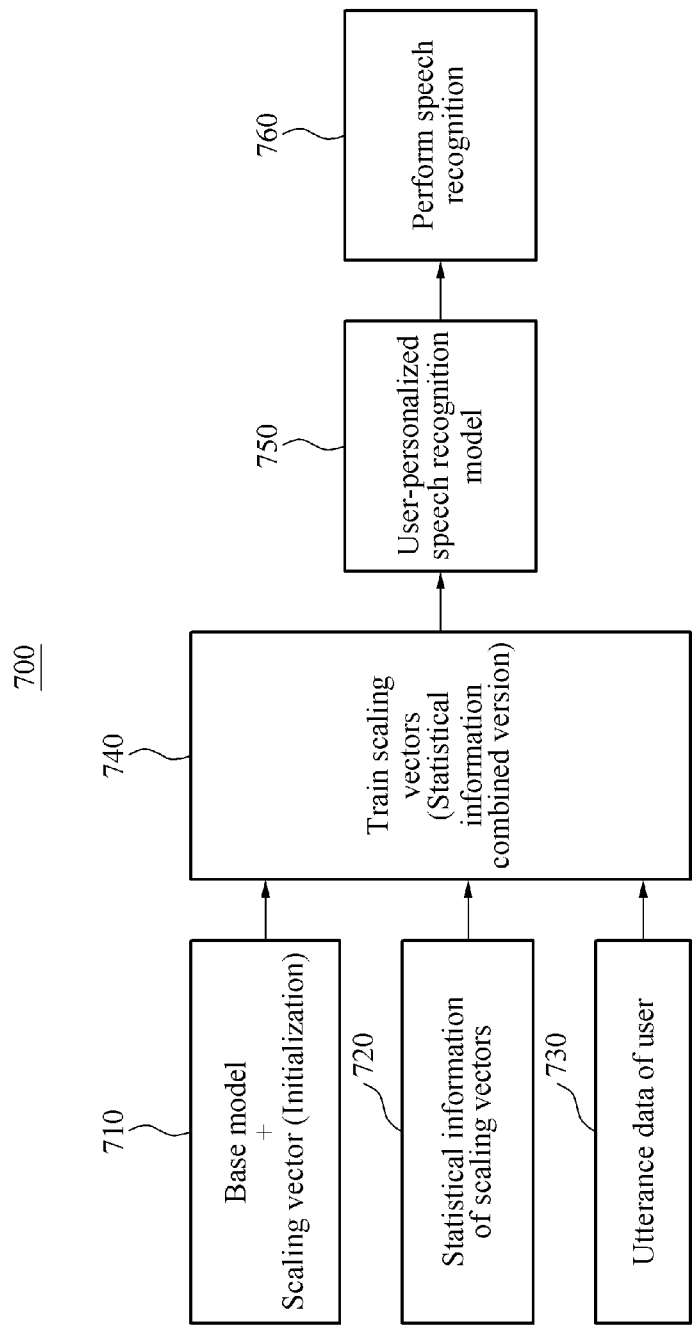
FIG. 7 illustrates an example of a process of performing a speech recognition.

FIG. 7 illustrates an example of a process of performing a speech recognition. Referring to FIG. 7, a speech recognition base model 710, statistical information 720 of scaling vectors, utterance data 730 of a user, a user-personalized speech recognition model 750, operation 740 of training the scaling vectors, and operation 760 of performing a speech recognition are illustrated.

The speech recognition base model 710 is an initial model used to personalize an actual speech recognition model and corresponds to, for example, the speech recognition base model 410.

The statistical information 720 of the scaling vectors is statistical information of the scaling vectors (the first scaling vectors) obtained in operation 450 of FIG. 4, for example. The statistical information 720 of the scaling vectors is added to an objective function of a basic function for training of the second scaling vector later in operation 740. A personalization apparatus trains the second scaling vector by reflecting a predetermined portion of the statistical information 720 of the scaling vectors based on a reflectance rate of the statistical information. The statistical information 720 of the scaling vectors is stored in the personalization apparatus in advance of a process of personalizing a speech recognition model or is transmitted from a separate storage device to the personalization apparatus through a communication interface.

The utterance data 730 of the user is utterance data of an actual user and includes as few as 1 to 3 sentences or as many as 10 or more sentences.

The personalization apparatus generates the user-personalized speech recognition model 750 by training the second scaling vector combined with the base model based on the statistical information 720 of the scaling vectors and the utterance data 730 of the user in operation 740.

In an example, operation 740 differs from operation 430 of FIG. 4. The personalization apparatus adds the statistical information 720 of the scaling vectors to a loss function of the base model, for example, in a form as expressed by Equation 1. In an example, a degree of involvement of advance statistical information (the statistical information 720 of the scaling vectors) in the user-personalized speech recognition model 750 changes depending on the reflectance rate of the statistical information 720 of the scaling vectors determined based on a quantity of the utterance data.

For example, if a quantity of the utterance data 730 of the user is relatively small, elements of a scaling vector to be trained are not trained well, or values of the elements of the scaling vector are bounced to a very great value or a very small value. However, by forcing training of a scaling vector to be performed using statistical information of pre-obtained scaling vectors within a predetermined range, a personalization of a speech recognition model is performed quickly without the risk described above, whereby the user-personalized speech recognition model 750 is generated. In operation 760, the personalization apparatus performs a speech recognition of the user using the personalized speech recognition model.

A meaning of each scaling vector in a corresponding model in an example of applying scaling vectors for personalization is verified through the advance statistical information (for example, the statistical information 720 of the scaling vectors), and training of the speech recognition model for personalization is induced correctly and quickly using the same for an actual personalization process.

The speech recognition model is personalized adaptively in a manner that adjusts a utilization degree of the statistical information of the scaling vectors based on the quantity of utterance data for user personalization.

Further, a change in speech characteristic of the user is recognized by mixing a variety of noise when forming a dataset to obtain the statistical information of the scaling vectors and maximally training the statistical information of the scaling vectors using speech information rather than environment information.

Figure 8:
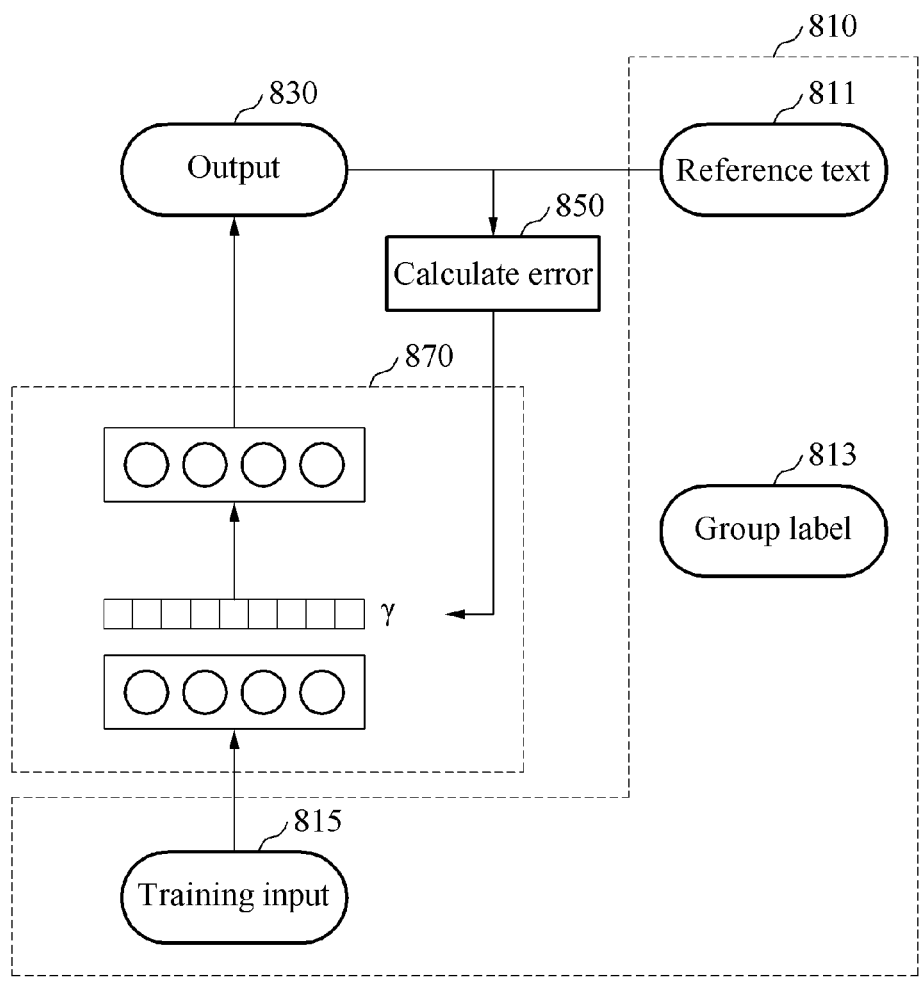
FIG. 8 illustrates an example of a process of training a second scaling vector.

FIG. 8 illustrates an example of a process of training a second scaling vector. Referring to FIG. 8, training data 810, an output value 830 of a personalized speech recognition model 870, an error (loss) 850 between the training data 810 and the output value 830 of the personalized speech recognition model 870, and the personalized speech recognition model 870 are illustrated.

A personalization apparatus preloads statistical information of a scaling vector (a second scaling vector) required by an individual user terminal and stores the statistical information in a memory. The personalization apparatus trains first scaling vectors in advance of obtaining a speech recognition request from a user.

The personalization apparatus generates a base model for a predetermined user based on the training data 810. The first scaling vectors combined with the base model have values initialized before training. The initial values of the first scaling vectors are, for example, "1".

In response to a speech signal (or utterance data) being obtained from a user, the personalization apparatus trains the second scaling vector based on the obtained speech signal so as to minimize a loss of the personalized speech recognition model 870. For example, the personalization apparatus fixes remaining parameters (for example, a weight vector and a bias) of the personalized speech recognition model 870 during training of the second scaling vector.

The personalization apparatus generates new training data 810 based on a speech signal newly obtained from the user. The new training data 810 includes a reference text 811, a group label 813, and a training input 815. The reference text 811 denotes true text data indicated by the corresponding training input 815. The group label 813 denotes data indicating a group corresponding to a language characteristic indicated by the corresponding training input 815. The training input 815 denotes feature data (or a feature vector) extracted from the speech signal or the utterance data.

The personalization apparatus trains the second scaling vector of the speech recognition model 870 (neural network), for example, through supervised learning. Supervised learning is a technique which inputs the training input 815 of the training data 810 and a training output (for example, the reference text 811) corresponding to the training input 815 together into the personalized speech recognition model 870 and updates the second scaling vector so as to output the output value 830 corresponding to the training output of the training data 810.

The personalization apparatus personalizes the second scaling vector of the personalized speech recognition model 870 through gradient descent based on output values 830 of nodes included in the neural network and a loss back-propagated to the neural network. For example, the personalization apparatus updates the second scaling vector through loss back-propagation learning. Loss back-propagation learning refers to a method of estimating a loss with respect to the provided training data 810 through forward computation, for example, calculating the error 850, and updating the scaling vectors to reduce the loss while propagating the estimated loss in a backward direction from an output layer toward a hidden layer and an input layer.

The personalization apparatus defines an objective function to be used to measure an optimality of the currently set second scaling vector and iteratively performs training by updating the second scaling vector based on a result of the objective function. For example, the objective function is a loss function to be used by the neural network to calculate a loss between an actual output value 830 and a value expected to be output (for example, the reference text 811) based on the training input 815 of the training data 810. The personalization apparatus updates the second scale vector to reduce a value of the loss function.

To reflect personalization of the user and recent speech characteristics of the user, the personalization apparatus trains the second scaling vector. When a speech signal of a predetermined user is input into the speech recognition model 870 of the users for personalization, the personalization apparatus updates a second scaling vector corresponding to the user.

The apparatus for personalizing a speech recognition model updates the personalized speech recognition model 870 to be optimized further to the speech characteristic of the corresponding user each time the individual user uses the personalized speech recognition model 870.

Figure 9:
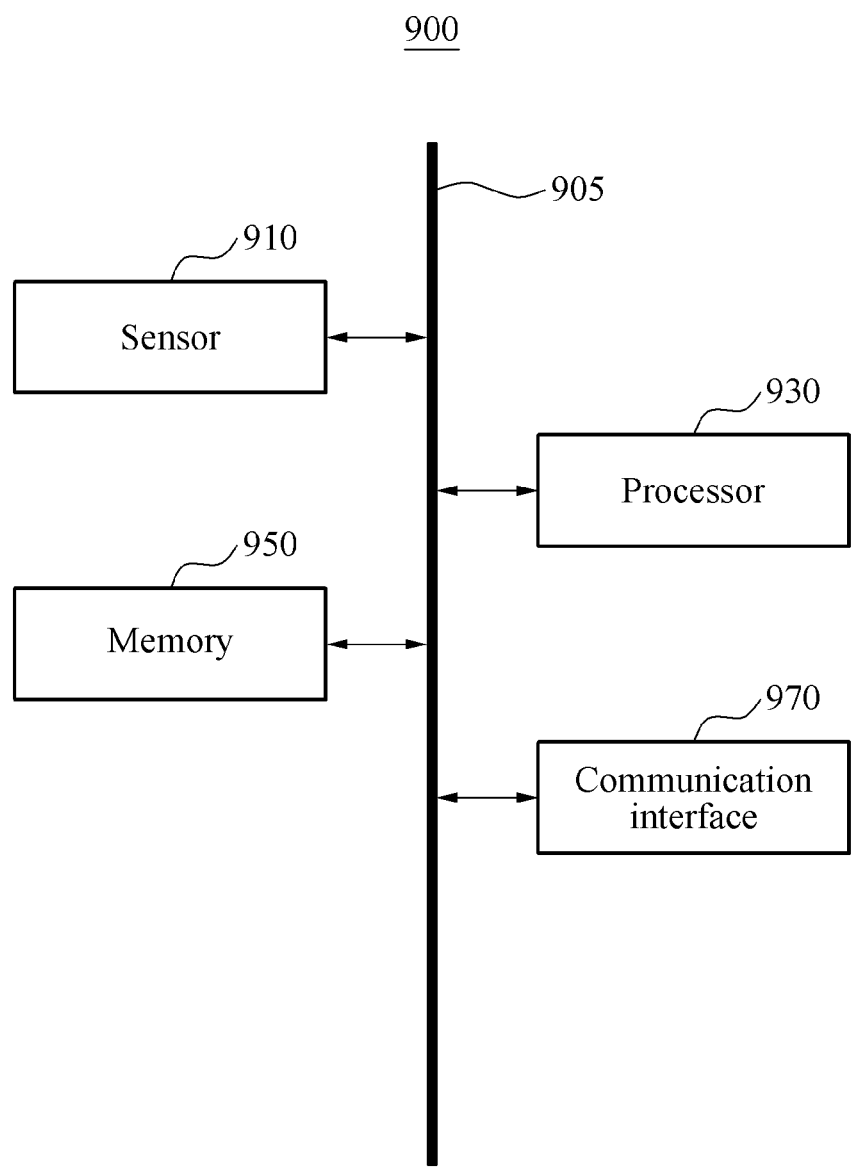
FIG. 9 is a block diagram illustrating an example of an apparatus for personalizing a speech recognition model.

FIG. 9 is a block diagram illustrating an example of an apparatus for personalizing a speech recognition model. Referring to FIG. 9, a personalization apparatus 900 includes a sensor 910, a processor 930, a memory 950, and a communication interface 970. The sensor 910, the processor 930, the memory 950, and the communication interface 970 are connected to each other through a communication bus 905.

The sensor 910 obtains (senses) a speech of a user and/or utterance data of the user.

The processor 930 generates a personalized speech recognition model by personalizing a second scaling vector combined with a base model based on the utterance data of the user and statistical information. However, the operation of the processor 930 is not limited thereto. The processor 930 performs the operations described with reference to FIGS. 1 through 8.

The processor 930 is a hardware-implemented data processing device having a circuit with a physical structure to perform desired operations. For example, the desired operations include codes or instructions included in a program. The hardware-implemented data processing device includes a microprocessor, a central processing unit (CPU), a processor core, a multi-core processor, a multiprocessor, an application-specific integrated circuit (ASIC), and a field programmable gate array (FPGA).

The processor 930 executes the program and controls the personalization apparatus 900. The program codes executed by the processor 930 are stored in the memory 950.

The memory 950 stores the instructions to be executed by the processor 930, a base model for speech recognition, and/or a personalized speech recognition model. The personalized speech recognition model is a statistical speech recognition model or a neural network based speech recognition model. In an example in which the personalized speech recognition model is a neural network, the memory 950 stores a parameter such as a weight of each layer of the neural network. Further, the memory 950 stores the second scaling vector. The memory 950 includes a volatile memory or a non-volatile memory. The memory 950 includes a large capacity storage medium such as a hard disk to store the variety of data.

The communication interface 970 obtains statistical information of first scaling vectors combined with the base model for speech recognition. Further, the communication interface 970 refers to an element configured to receive the speech of the user or an answer text or suggest a recognition result or a guide text to the user. For example, the communication interface 970 includes a microphone to receive the speech of the user. In an example, the personalization apparatus may further include an input/output interface (not shown) including a touch pad, a touch screen, or a keyboard configured to receive the answer text from the user. The input/output interface includes a display configured to suggest the recognition result or the guide text.

The personalization apparatus 900, the sensor 910, the processor 930, the memory 950, the communication interface 970, the communication bus 905, and other apparatuses, units, modules, devices, and other components described herein with respect to FIGS. 1-9 are hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of personalizing a speech recognition model, the method comprising:
   obtaining statistical information of first scaling vectors combined with a base model for speech recognition;
   obtaining utterance data of a user based on reference text data; and
   generating a personalized speech recognition model by modifying a second scaling vector combined with the base model based on a first loss determined based on the utterance data of the user and a second loss determined based on the determined first loss and the statistical information,
   wherein the first loss is based on a difference between the utterance data and the reference text data.

2. The method of claim 1, wherein:
   the first scaling vectors correspond to a plurality of speakers; and
   the second scaling vector corresponds to the user.

3. The method of claim 1, wherein the generating comprises:
   initializing the second scaling vector; and
   training the second scaling vector based on the utterance data of the user and the statistical information.

4. The method of claim 3, wherein the training comprises:
   determining the first loss based on the utterance data of the user;
   determining the second loss based on the determined first loss and the statistical information; and
   training the second scaling vector based on the second loss.

5. The method of claim 1, wherein the statistical information comprises either one or both of a mean and a variance generated by approximating a Gaussian distribution of the first scaling vectors corresponding to a plurality of speakers.

6. The method of claim 5, wherein:
   each of the first scaling vectors comprises a plurality of elements; and
   the mean and the variance is calculated for each of the plurality of elements.

7. The method of claim 1, wherein the generating comprises:
   determining a reflectance rate of the statistical information based on the utterance data; and
   generating the personalized speech recognition model by training the second scaling vector by reflecting the statistical information in a loss function of the base model based on the reflectance rate.

8. The method of claim 7, wherein the reflecting of the statistical information comprises determining a difference between the loss function of the base model and a value determined based on the reflectance rate and a variance of a distribution of the first scaling vectors.

9. The method of claim 7, wherein the determining comprises adjusting the reflectance rate of the statistical information based on a quantity of the utterance data.

10. The method of claim 9, wherein:
    the reflectance rate is adjusted to be greater for a first quantity of the utterance data than for a second quantity of the utterance data; and
    the first quantity of utterance data is less than the second quantity of utterance data.

11. The method of claim 9, further comprising:
    updating the statistical information, in response to the second scaling vector being changed in response to the training.

12. The method of claim 1, further comprising:
    recognizing a speech of the user using the speech recognition model.

13. A non-transitory computer-readable storage medium storing instructions that, when executed by one or more processors, cause the one or more processors to perform the method of claim 1.

14. A processor-implemented method of personalizing a speech recognition model, the method comprising:
obtaining statistical information of first scaling vectors combined with a base model for speech recognition;
obtaining utterance data of a user; and
generating a personalized speech recognition model by modifying a second scaling vector combined with the base model based on the utterance data of the user and the statistical information,
wherein:
the base model comprises a plurality of neural network layers; and
the first scaling vectors are combined between at least a portion of the plurality of layers.

15. The method of claim 14, wherein:
the plurality of layers comprise one or more hidden layers; and
the one or more hidden layers are each combined with a respective first scaling vector of the first scaling vectors, such that an output of each of the one or more of the hidden layers is adjusted based on the respective first scaling vector.

16. A processor-implemented method of personalizing a speech recognition model, the method comprising:
obtaining statistical information of first scaling vectors combined with a base model for speech recognition;
obtaining utterance data of a user; and
generating a personalized speech recognition model by modifying a second scaling vector combined with the base model based on the utterance data of the user and the statistical information,
wherein the generating comprises:
training, in response to the utterance data being obtained, the second scaling vector based on the utterance data by fixing the statistical information while training the second scaling vector.

17. A processor-implemented method of personalizing a speech recognition model, the method comprising:
obtaining a base model for speech recognition using speech data corresponding to a plurality of speakers;
generating statistical information of scaling vectors combined with the base model by applying datasets comprising the speech data to the scaling vectors; and
providing the statistical information to generate a personalized speech recognition model,
wherein the generating of the statistical information comprises generating the statistical information of the scaling vectors by training the scaling vectors using the datasets to minimize a loss of the base model.

18. The method of claim 17, wherein the generating of the statistical information comprises:
generating per-speaker datasets based on the speech data;
training the scaling vectors using each of the per-speaker datasets; and
generating the statistical information of the scaling vectors based on a result of training the scaling vectors.

19. The method of claim 18, wherein:
at least a portion of the speech data comprises a speaker identifier; and
the generating of the per-speaker datasets comprises:
classifying per-speaker speech data using the speaker identifier included in the speech data, and
generating the per-speaker datasets using the per-speaker speech data.

20. The method of claim 19, wherein the generating of the per-speaker datasets using the per-speaker speech data comprises either one or both of:
generating a single dataset using all the per-speaker speech data; and
generating a single dataset using a portion selected at random from the per-speaker speech data.

21. The method of claim 18, wherein:
the training comprises training the scaling vectors using the per-speaker datasets; and
the scaling vectors correspond to at least a portion of layers of the base model.

22. The method of claim 18, wherein the training comprises training the scaling vectors independently for each of the per-speaker datasets.

23. The method of claim 17, wherein the generating of the statistical information comprises generating a mean and a variance of the scaling vectors by approximating a Gaussian distribution of the scaling vectors.

24. An apparatus for personalizing a speech recognition model, the apparatus comprising:
a communication interface configured to obtain statistical information of first scaling vectors combined with abase model for speech recognition;
a sensor configured to obtain utterance data of a user based on reference text data; and
one or more processors configured to generate a personalized speech recognition model by modifying a second scaling vector combined with the base model on a first loss determined based on the utterance data of the user and a second loss determined based on the determined first loss and the statistical information,
where the first loss is based on a difference between the utterance data and the reference text data.

25. A processor-implemented method of personalizing a speech recognition model, the method comprising:
obtaining distribution variance information of elements of first scaling vectors, wherein the first scaling vectors are combined with a speech recognition base model and were previously-trained based on speech datasets of a plurality of speakers; and
generating a personalized speech recognition model by training a second scaling vector combined with the base model based on a first loss determined based on utterance data of a user and a second loss determined based on the determined first loss and the distribution variance information,
wherein the utterance of the user is based on reference text data, and
wherein the first loss is based on a difference between the utterance data and the reference text data.

* * * * *